J. C. ROSS.
TRACTOR.
APPLICATION FILED JULY 23, 1919.
1,402,093.
Patented Jan. 3, 1922.
5 SHEETS—SHEET 2.
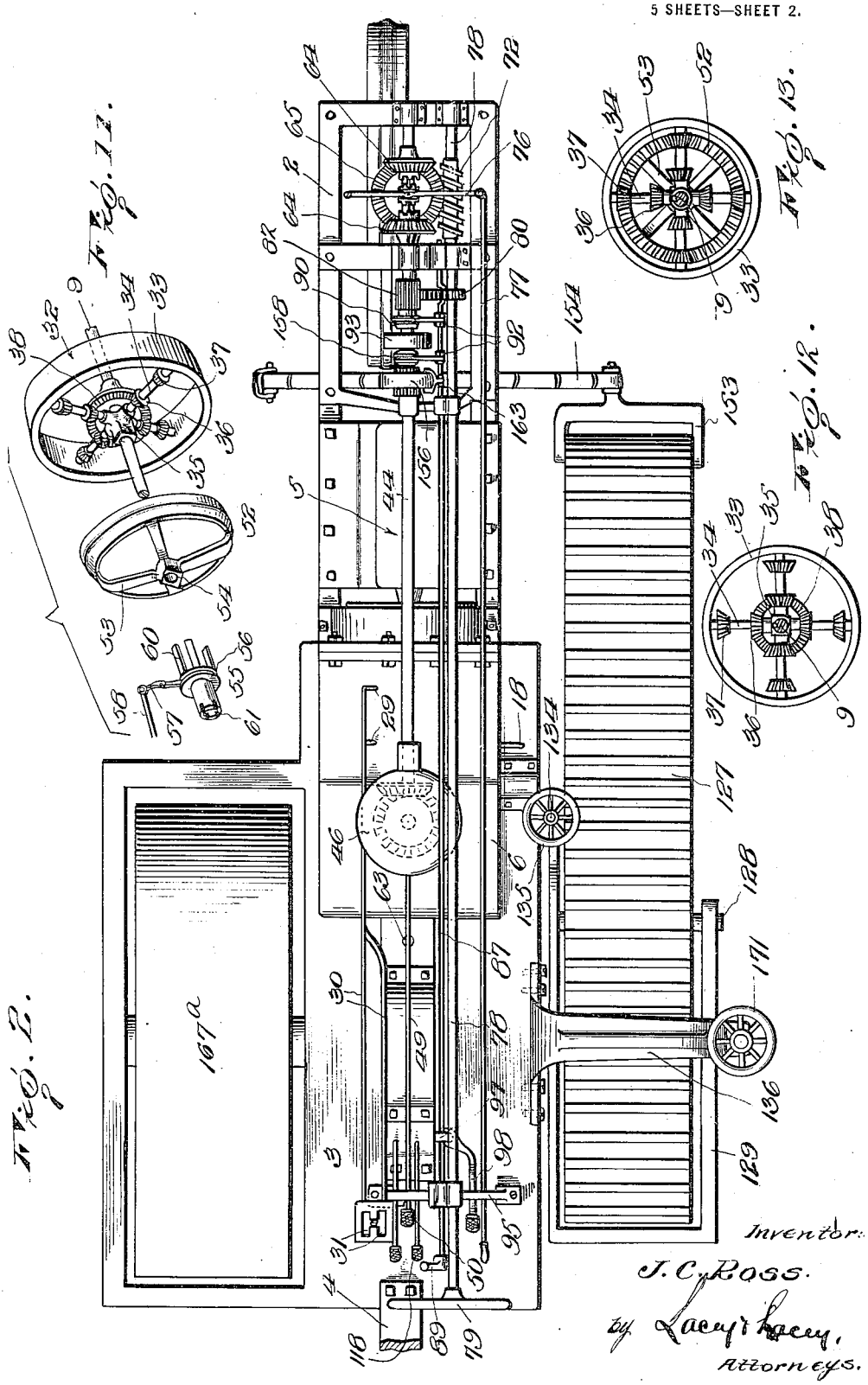
Inventor:
J. C. Ross.
by Lacey & Lacey,
Attorneys.

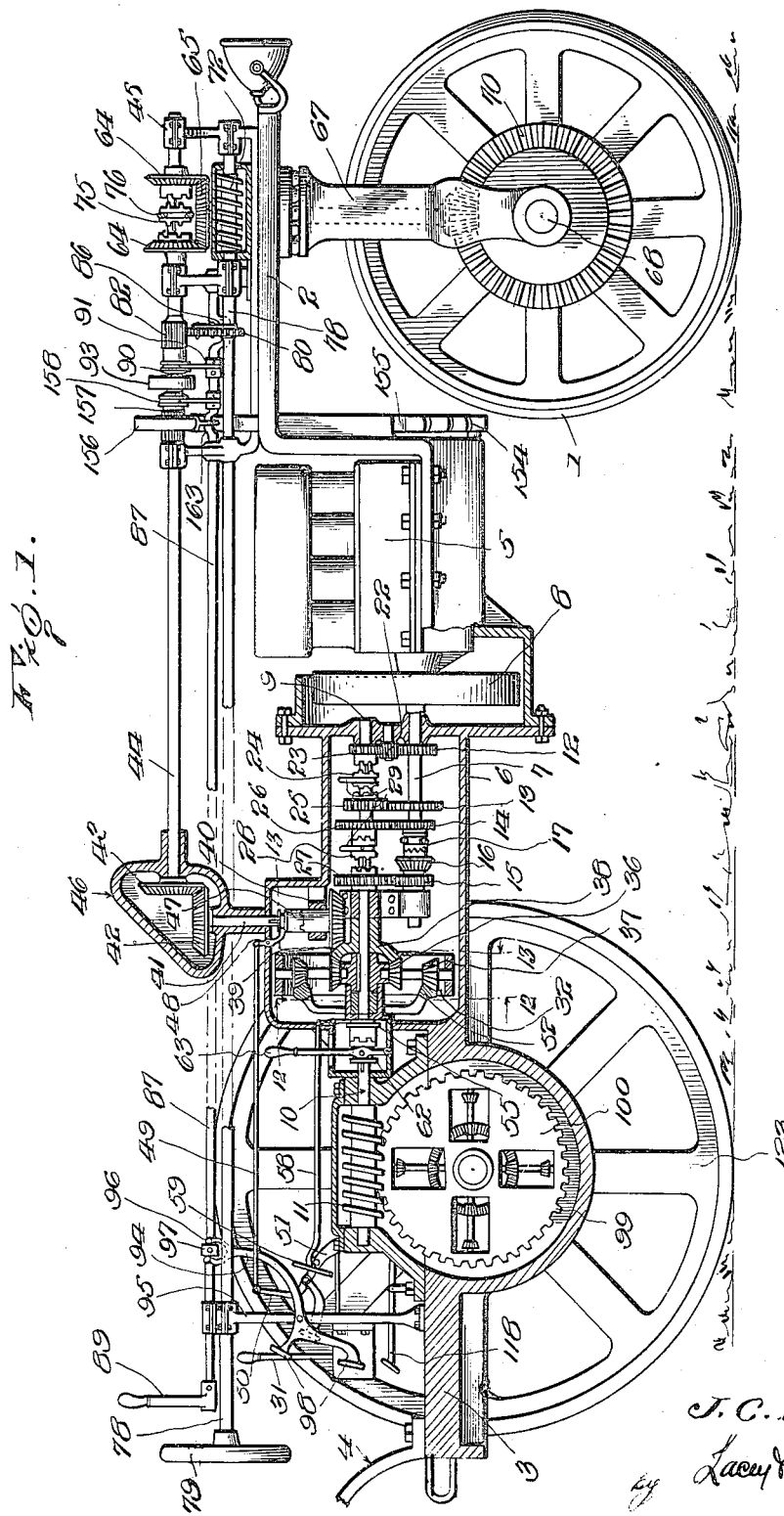

J. C. ROSS.
TRACTOR.
APPLICATION FILED JULY 23, 1919.
1,402,093.
Patented Jan. 3, 1922.
5 SHEETS—SHEET 3.
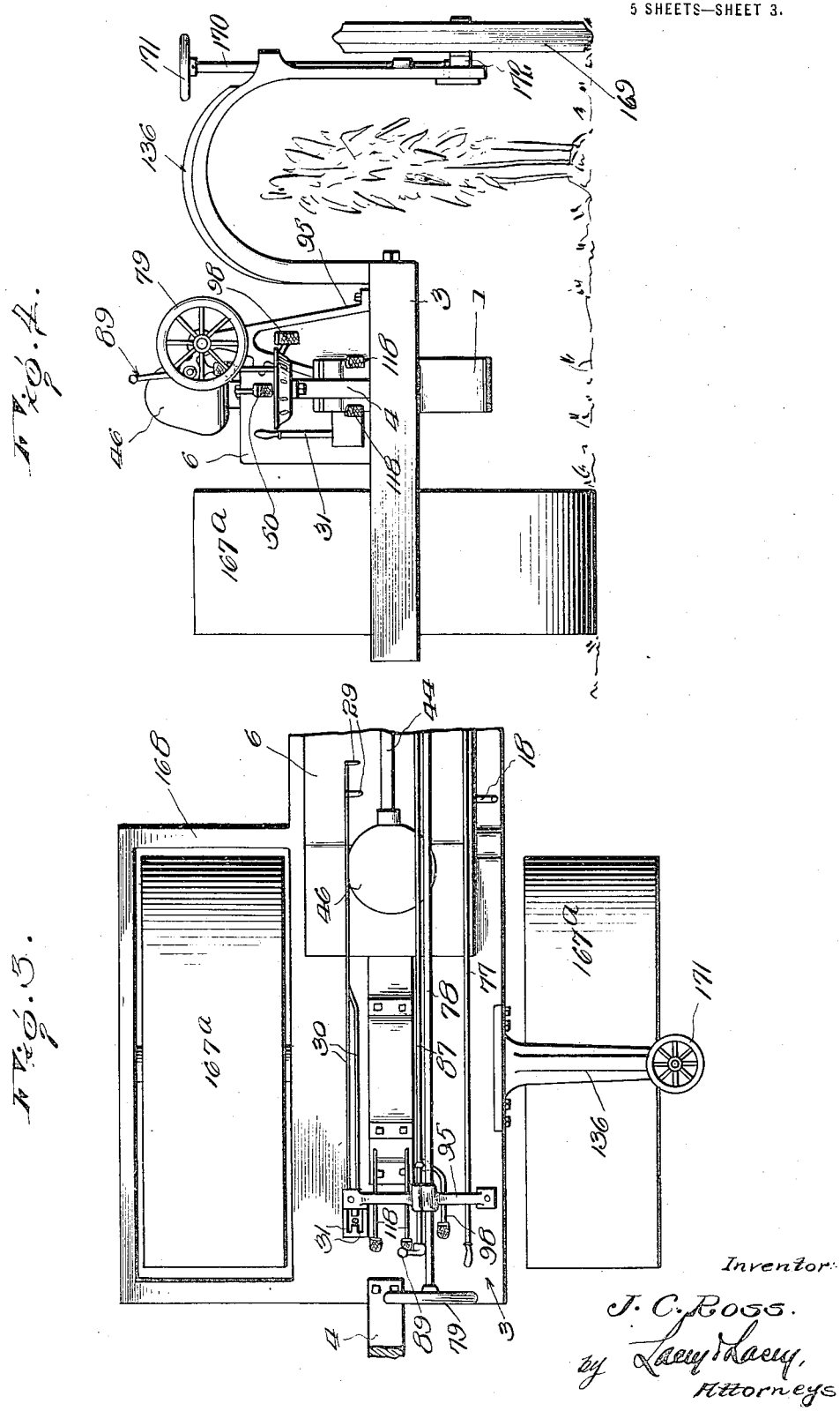
Inventor
J. C. Ross.
by Lacey & Lacey,
Attorneys

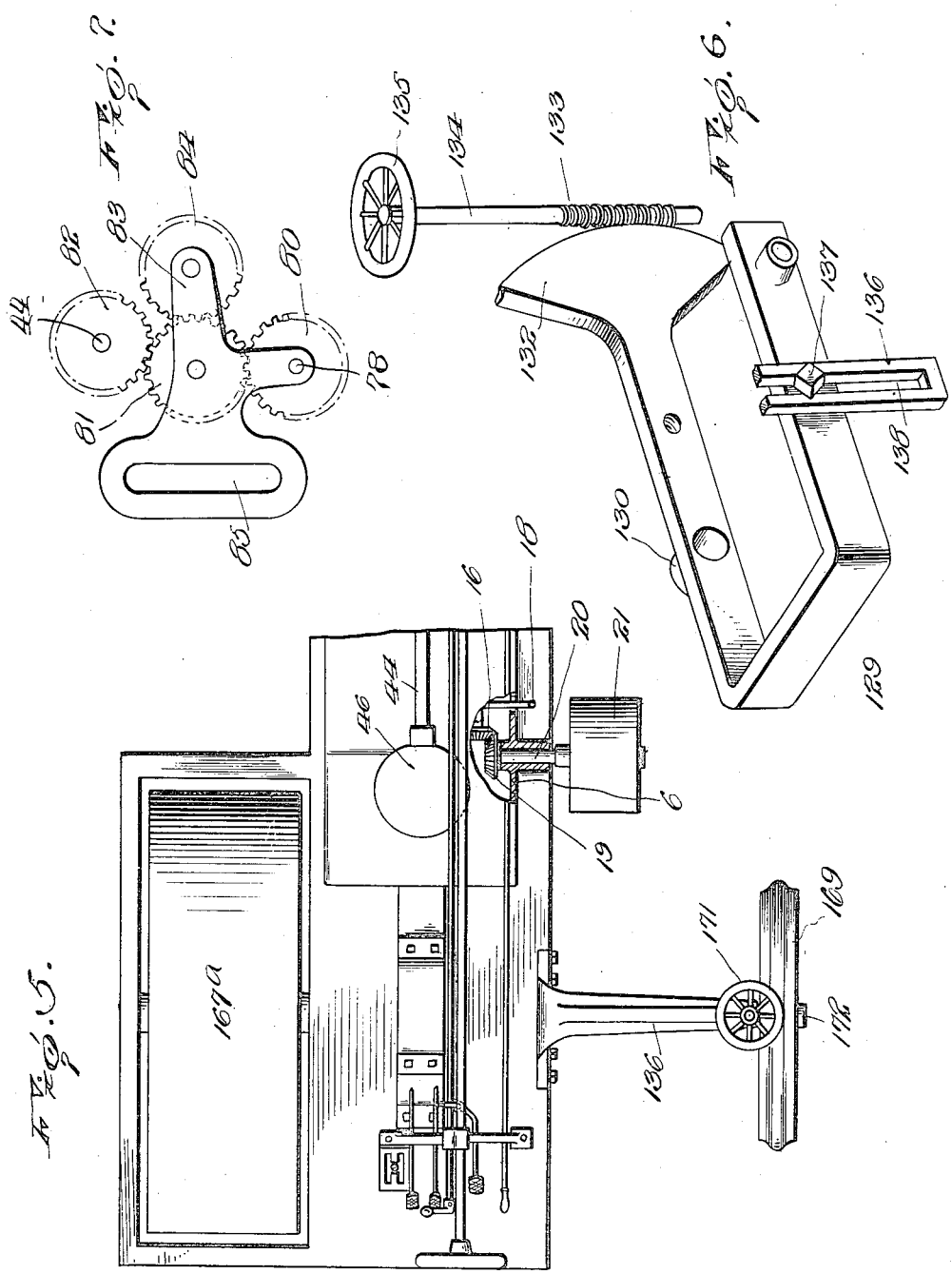

J. C. ROSS.
TRACTOR.
APPLICATION FILED JULY 23, 1919.
1,402,093.
Patented Jan. 3, 1922.
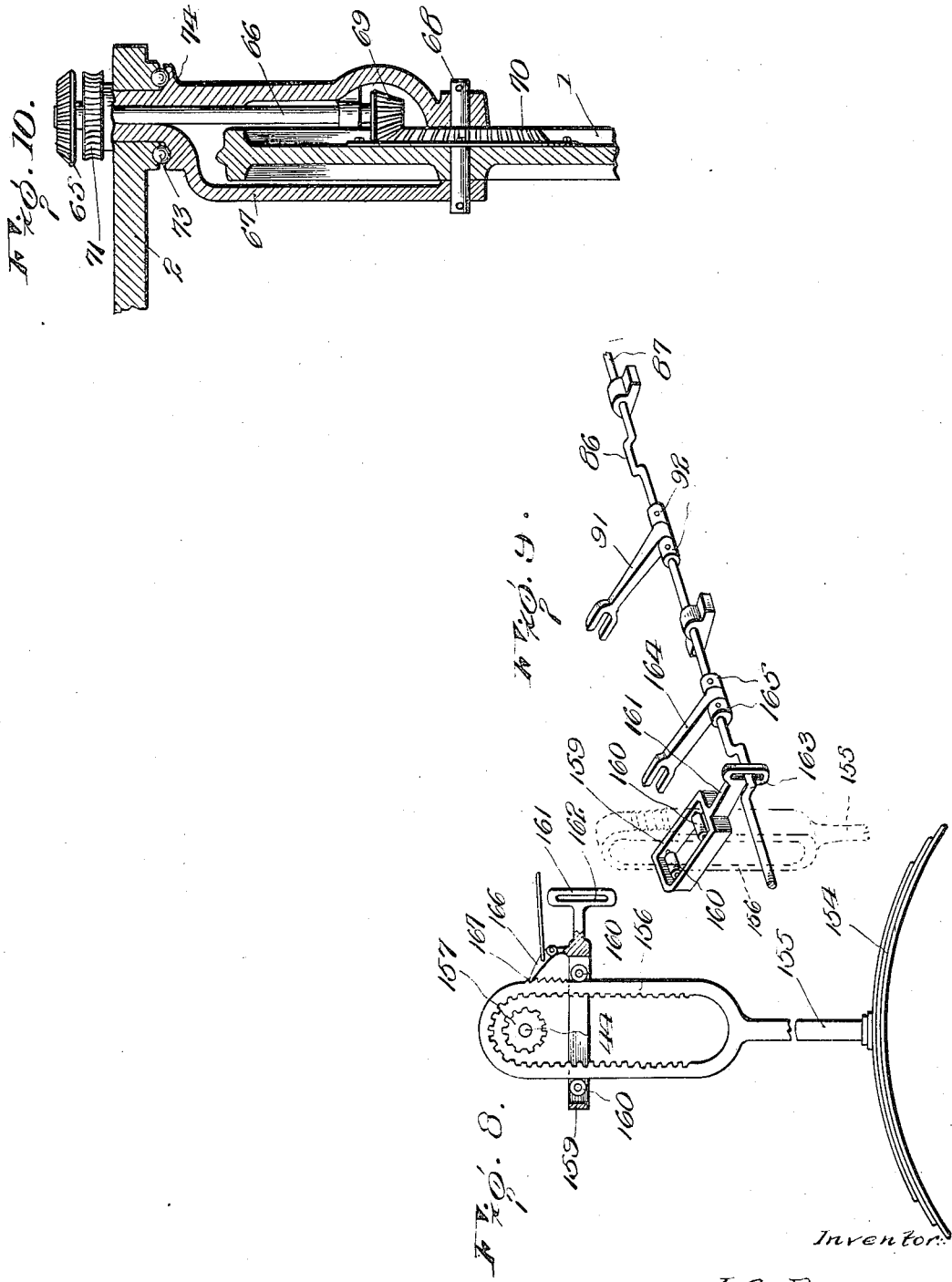

UNITED STATES PATENT OFFICE.

JOHN C. ROSS, OF AKRON, OHIO.

TRACTOR.

1,402,093. Specification of Letters Patent. Patented Jan. 3, 1922.

Application filed July 23, 1919. Serial No. 312,665.

*To all whom it may concern:*

Be it known that I, JOHN C. Ross, a citizen of the United States, residing at Akron, in the county of Summit and State of Ohio, have invented certain new and useful Improvements in Tractors, of which the following is a specification.

The object of this invention is to provide a compactly arranged tractor especially adapted for use upon farms and in which power may be transmitted to the rear driving wheels and also to the front steering wheel so as to propel the machine in all conditions of soil. A further object of the invention is to provide means whereby the power may be applied solely to the rear wheels or solely to the steering wheel when so desired and a still further object of the invention is to provide means whereby the steering may be accomplished manually or from power derived from the engine. A still further object of the invention is to provide means whereby either rear wheel may be left free of the propelling power if so desired to facilitate turning, and a still further object of the invention is to provide means whereby the form of the supporting and driving members may be altered to conform to various conditions of the soil and may be adjusted vertically according to circumstances. The invention also seeks further to simplify the construction and arrangement of all the parts whereby to increase the efficiency and durability of the machine while economizing in the cost of production and upkeep.

The invention is illustrated in the accompanying drawings and will be hereinafter fully described, the novel features being subsequently particularly pointed out in the appended claims.

In the drawings—

Figure 1 is a view partly in elevation and partly in longitudinal section of one embodiment of the invention;

Fig. 2 is a plan view showing a somewhat different embodiment of the invention;

Fig. 3 is a plan view of the rear portion of the machine showing another embodiment of the invention;

Fig. 4 is a rear elevation of the arrangement shown in Fig. 3;

Fig. 5 is a plan view of the rear portion of the machine showing a further embodiment of the invention:

Fig. 6 is a detail perspective view of means for adjusting a rear ground wheel or traction member vertically;

Fig. 7 is a detail view of a train of gearing adapted to facilitate steering of the vehicle under power from the engine;

Fig. 8 is a detail view of a portion of the means for raising and lowering the front end of the endless traction mechanism illustrated in Fig. 2.

Fig. 9 is a detail perspective view of a portion of the means for controlling the raising and lowering mechanism illustrated in Fig. 8 and for controlling the means for transmitting power to the front wheel;

Fig. 10 is a vertical section through the steering wheel and the coacting parts;

Fig. 11 is a perspective view of the parts of the differential gearing for connecting the transmission shaft with the front and rear wheels;

Fig. 12 is a detail section on the line 12—12 of Fig. 1;

Fig. 13 is a similar view taken on the line 13—13 of Fig. 1.

In carrying out the invention, I employ a suitable supporting frame which is carried at its front end by a single steering wheel 1 and will preferably be mounted at its rear end upon two ground-engaging members, one disposed at each side so that the tractor will be essentially of a tricycle type. The supporting frame 2 will be constructed generally of metallic bars suitably shaped to accommodate the parts and to provide a platform 3 in the rear portion to which a seat standard 4 may be secured. An engine 5, represented conventionally and preferably of the internal combustion type, is mounted upon an intermediate portion of the frame and the gearing whereby the power of the engine is transmitted to the ground-engaging members will be inclosed by a gear casing 6, as shown and as will be readily understood.

The engine shaft 7 carrying the usual fly wheel 8 is extended rearwardly and supported in suitable bearings in the casing 6 and above the engine shaft within the said casing is mounted a transmission shaft 9 which terminates adjacent the rear end of the said casing, a second transmission shaft 10 being disposed in alinement with the shaft 9 and carried over the rear driving shaft where it is equipped with a worm 11, as clearly shown in Fig. 1. Upon the engine shaft 7, I secure a plurality of pinions 12, 13, 14 and 15 which constitute members of trains of transmission gearing whereby different speeds may be transmitted to the shaft 9 and also whereby the rotation of said shaft may be reversed. A beveled pinion 16 is mounted loosely upon the engine shaft and is adapted to be operatively connected therewith by a clutch 17 controlled by a lever 18 projecting through the side of the gear casing and the said pinion meshes with a similar pinion 19 on the inner end of a short shaft 20 which is journaled in a suitable bearing on the side of the gear casing 6 and upon the outer end of which a band pulley 21 may be secured so that power may be transmitted to a threshing machine or other machinery, it being understood, of course, that when the pulley 21 is in use the tractor will remain stationary and that when the tractor is traveling the clutch 17 will be out of engagement with the clutch hub of the pinion 16. The pinion 12 meshes with an idler 22 carried by the front end of the gear casing and this idler 22 in turn meshes with a pinion 23 which is fitted loosely upon the shaft 9 and is constructed with a clutch hub adapted to be engaged by one side of a clutch 24 feathered upon the shaft 9 so that if the said clutch be thrown in engagement with the clutch hub of the pinion 23 the shaft 9 will be rotated in a direction to cause rearward travel of the tractor. The pinion 13 meshes with a pinion 25 which is loosely mounted on the shaft 9 and is provided with a clutch hub adapted to be engaged by one side of the clutch member 24 so that if the pinion 25 be operatively locked to the shaft 9 the tractor will be driven forwardly and at the highest speed of which the machine is capable. The pinion 14 is arranged, as shown, close to the pinion 13 and meshes with a pinion 26 loosely mounted upon the shaft 9, the pinions 14 and 26 being so proportioned that they will drive the tractor at a speed less than that imparted by the pinions 13 and 25, while adjacent the rear end of the engine shaft the pinion 15 is disposed to mesh with a pinion 27 loosely mounted upon the shaft 9 and the pinions 15 and 27 are so proportioned that when in operation they will propel the tractor at a speed lower than either of the previously described trains of gearing. A clutch 28 is feathered upon the shaft 9 between the pinions 26 and 27 and is adapted to lock either of said pinions to said shaft. The clutches 24 and 28 are controlled by yokes or levers 29 mounted in any convenient manner in the gear casing and connected by links 30 with controlling levers 31 at the rear end of the machine where they may be easily manipulated by the operator. It will be readily understood that if the clutches 24 and 28 be arranged in neutral position out of engagement with all the clutch hubs, the pinions upon the shaft 9 will rotate freely without imparting movement to said shaft and that the speed of said shaft and the direction of rotation of the same will be controlled by shifting the proper clutch 24 or 28 to lock either of the pinions adjacent the respective clutch to the shaft. Adjacent the rear end of the shaft 9, I secure thereto the master wheel 32 of a differential gear from which power is transmitted to the parts which directly drive the ground-engaging members and by which the division of the power applied to said members is controlled. The master wheel 32 comprises a rim 33 which is connected by spokes or radial arms 34 with a hub 35 which is keyed to the shaft 9. The spokes 34 are mounted for relative rotation in the rim 33 and the hub 35 and upon the spokes I secure beveled pinions 36 and 37, the inner pinions 36 meshing with one side of a circular rack or idler gear 38 which is loosely fitted upon the shaft 9 immediately in advance of the hub 35 and is provided on its forward side with gear teeth or a rack meshing with a beveled gear 39 journaled in a bearing 40 within the gear casing 6 and loosely fitting upon a vertical shaft 41. The said shaft 41 extends through the top of the casing 6 and is equipped at its upper end with a beveled gear 42 meshing with a similar gear 43 on the rear end of a shaft 44 which extends longitudinally of the machine and has its front end supported in a bearing 45 at the front end of the frame 2. The gears 42 and 43 are enclosed within a gear casing 46 so that they will be protected from dust and dirt and may run in oil if so desired. Upon the shaft 41 above the lower end thereof, I feather a clutch member 47 which is adapted to engage the clutch hub of the gear 39 and thereby lock said gear to the shaft 41 so that motion will be imparted to said shaft. The clutch 47 is controlled by a lever 48 fulcrumed suitably in the wall of the gear casing 6 and connected by a link 49 with a foot lever 50 fulcrumed upon a bracket 51 at the rear end of the machine. The outer pinions 37 of the master wheel 32 mesh with a gear ring or circular rack 52 which is supported loosely upon the rear end of the shaft 9 by spokes 53 extending between the rack and the hub 54, said hub having an angular external configuration and the rear end of the hub 35 being of the same shape as the said hub 54. Slidably mounted upon the front end of the shaft 10 is a clutch 55 having an annular groove 56 to receive the end of a shifting lever 57 which is connected by a link 58 with a treadle 59 fulcrumed between its ends upon the bracket 51. The clutch 55 is constructed at its forward end with fingers 60 adapted to pass between the spokes 53 of the gear 52 and bear against the flat sides of the hub 54 to engage the flat sides or faces of the hub 35 and thereby lock the gear 52 to the hub of the master wheel. The rear end of the clutch 55 is constructed with teeth or lugs 61 to engage similar members upon a clutch 62 which is feathered upon the shaft 10 and controlled by a hand lever 63. If the clutches 55 and 62 be moved rearwardly so that the clutch 55 is free of the hub 35 the shafts 10 and 44 will remain at rest, but if the clutch 55 be thrown forward, while holding the clutch 62 at the rear limit of its movement, power will be transmitted to the shaft 44 while the shaft 10 will remain at rest, providing, of course, the clutch 47 be engaged with the hub of the gear 39. If, while the clutch 55 is in its forward position, the clutch 62 be thrown forward to engage the members 61 power will be transmitted to the shaft 10 and will or will not be transmitted to the shaft 44 accordingly as the clutch 47 is thrown in or out.

Upon the shaft 44, adjacent the front end thereof, I loosely mount the oppositely disposed beveled gears 64 which mesh with a beveled gear 65 secured on the upper end of a shaft 66 which is journaled in the casing 67 carrying the axle 68 of the steering wheel 1 in its lower end. A beveled pinion 69 on the lower end of the shaft 66 meshes with a gear 70 formed on or secured to one side of the steering wheel 1 so that the said wheel may be positively rotated and thereby aid in the travel of the machine. The said wheel 1 is disposed at one side of the longitudinal center of the machine so that it will be out of alignment with the plows or other ground turning or treating instrumentalities which are to be drawn over a field by the tractor and will thereby assist in restraining the lateral thrust so as to aid in keeping the machine in the desired line of travel. The casing 67 containing the shaft 66 and the steering wheel is journaled or swiveled in the supporting frame 2, as shown clearly in Fig. 10, and is equipped at its upper end above the frame with a worm pinion 71 in mesh with a worm 72 so that if the worm 72 be rotated the frame 67 will be caused to swing about the shaft 66 as a center and thereby steer the machine. To enable the casing to turn easily while supporting the main frame, ball bearings 73 are interposed in raceways between the underside of the frame 2 and the crown 74 of the casing 67. A clutch 75 is feathered upon the shaft 44 between the gears 64 and is adapted to engage the clutch hub of either gear so as to lock said gear accordingly as it is desired to rotate the gear 65 and the shaft 66 in one or the other direction and thereby control the direction of rotation of the steering wheel 1. The clutch 75 is controlled by a lever 76 fulcrumed at one end upon the main frame and extending transversely thereof and having its free end pivoted to a controlling rod 77 extending to the rear end of the machine where it may be easily grasped by the operator. To manipulate the clutch obviously it is necessary merely to slide the controlling rod 77 forwardly or backwardly so that the lever 76 will be correspondingly swung. The worm 72 is fixed to a shaft 78 extending longitudinally of the machine and mounted in suitable bearings thereon, its rear end being equipped with a hand wheel 79 whereby it may be turned when desired so as to steer the machine. I also provide means whereby the shaft 78 may be driven by power from the engine if the conditions of the soil should make it difficult to effect manual steering or it be desired to turn the machine more rapidly than can be accomplished by hand. This means comprises a pinion 80 fixed upon the shaft 78 and meshing with an idler 81 which in turn meshes with an elongated pinion 82 upon the shaft 44. The pinion 81 is mounted upon a bracket 83 which carries a second idler 84 constantly in mesh with the idler 81 and the bracket is also constructed with a slotted arm 85 through which passes a crank 86 on a rock shaft 87 which is journaled in suitable bearings upon the top of the main frame, the said rock shaft being equipped at its rear end with a suitable handle 89. The pinion 82 is elongated, as shown in Fig. 1, and at one end is provided with a clutch member 90, the said clutch and said pinion being loose upon the shaft 44 and movable longitudinally of the same by means of a fork 91 which is fitted loosely upon the rock shaft 87 but is held against movement along said shaft by stop collars 92 secured upon the shaft and bearing against opposite sides of the fork. A clutch pulley 93 is secured upon the shaft 44 in position to be engaged by the clutch 90 and if the fork 91 be moved so as to throw the clutch 90 into engagement with the pulley the pinion 82 will be locked to the shaft 44 and consequently rotate with said shaft so as to transmit the motion through the idler 81 or the idler 84 to the pinion 80 thereby rotating the shaft 78. By rocking of the shaft 87, the crank 86 will be caused to work against the side wall of the slot 85 of the bracket 83 and thereby swing said bracket about the shaft 78 so that the pinion 81 or the pinion 84 will be brought into mesh with the pinion 82 and, consequently, the direction of rotation of the shaft 78 will be controlled. If the idler 81 is in mesh with the pinion 82 the idler 84 will run free and the pinion 80 will rotate so as to turn the shaft 78 in one direction, but if the bracket 83 be shifted so as to bring the idler 84 into mesh with the pinion 82 the motion will be transmitted through the idler 84 to the idler 81 and thence to the pinion 80 so that the shaft 78 will be rotated in the opposite direction. When the shaft 87 is rocked it will rotate in the end of the fork 91 without imparting movement to said fork and to impart movement to the fork the shaft is slid longitudinally whereupon the fork will move with the shaft by reason of the engagement of the same with the stop collars 92. The crank 86 obviously must be long enough to slide through the slot 85 with the longitudinal movement of the shaft 87 without becoming disengaged from said slot and it will thus be seen that a single controlling member will serve to operatively connect the train of gearing with the driven shaft and also determine the direction of rotation of the driving shaft. The handle 89 is preferably in the form of a crank or radially disposed lever and may be easily manipulated by the hand of the operator. In order to effect the desired longitudinal sliding movement of the shaft 87, however, I provide a rocking lever 94 which is fulcrumed upon a standard 95 rising from the platform 3 and this rocking lever is provided at its upper forward end with a fork 96 engaging an enlargement or shoulder 97 upon the shaft 87 so that when the lever is rocked the shaft will be shifted longitudinally. The lower end or arm of the lever 94 is equipped with foot rests 98 so that, if necessary, the rock shaft may be slid by the foot of the operator while at the same time it is rocked by hand.

The worm 11 meshes with the worm teeth 99 of a master gear 100 of a differential from which power is transmitted to the rear ground-engaging tractor members. In the form of the invention shown in Fig. 1 the differential acts directly on the rear axle of the tractor and the rear driving wheels 123 are secured directly upon the ends of the axle but the differential may drive pinions which engage internal rim gears on the traction wheels which wheels may run directly upon the ground or may have trained around them endless belt tractor members 127.

As shown in Fig. 2, the traction wheel supporting an endless belt member 127 may be carried by the side members of a substantially U-shaped frame 129. This frame 129 will be provided on its inner side member with a boss 130 adapted to pivotally fit around a coacting boss on the side of the main frame and the said side member of the U-shaped frame will be extended forward and have its front end enlarged segmentally, as shown at 132, and constructed to operatively engage a worm 133 formed on a vertically disposed shaft 134 suitably journaled upon the side of the main frame and equipped at its upper end with a hand wheel 135 so that, if the hand wheel and the shaft 134 be rotated, the worm 133 will act upon the segment 132 to swing the frame 129 about the boss 131 as a pivotal center and thereby raise or lower the axle 128 of the traction wheel. The outer side member of the frame 129 need not extend forwardly beyond the point of support for the axle 128 and to aid in maintaining the frame 129 in its proper position and prevent dropping of the outer side of said frame, I provide an arch 136 which is rigidly secured at its inner side or end to the main frame of the tractor and has its outer side member clamped to the outer side of the frame 129, as clearly shown in Figs. 2 and 6. The bolt or screw 137 by which the arch is secured to the outer side of the frame 129 passes through a slot 138 in the arch and this slot permits vertical adjustment of a ground-engaging wheel as will be presently set forth.

The endless chain tractor members 127 are built upon frames having extensions 153 which project forwardly beyond the tractor members and these extensions are connected to the ends of elliptical springs 154 disposed transversely of the machine and secured centrally to the lower end of a hanger 155 having its upper portion formed into an elliptical internal rack 156. The rack 156 passes over the shaft 44 and is normally spaced therefrom, an elongated pinion 157 being fitted loosely upon said shaft adjacent the upper end of the rack in position to be engaged by the same. This pinion 157 is constructed at its forward end with a clutch 158 adapted to be thrown into engagement with the clutch pulley 93 so that said pinion will rotate with the shaft and means are provided to shift the rack 156 into or out of mesh with the pinion in order to raise or lower the hanger 155 and the front ends of the tractor members in order to adjust said tractor members to operate most advantageously. To effect the shifting of the rack 156, I employ a looped bracket 159 which encircles the rack, as shown clearly in Fig. 8, and is equipped with rollers 160 to reduce the frictional wear upon the sides of the rack in the operation of the device. This looped bracket is constructed with an arm 161 having a longitudinal slot 162 through which a crank 163 of the rock shaft 87 passes. The clutch 158 is controlled by a fork 164 fitted upon the rock shaft 87 between stop collars 165 secured upon the said shaft so that if the shaft be shifted longitudinally the clutch 158 will be thrown into or out of engagement with the clutch pulley 93 and if the shaft be rocked the bracket 159 will be caused to swing the rack 156 so that one or the other side thereof will mesh with the pinion 127 and consequently the rack and the hanger will be caused to move upwardly or downwardly as may be desired. To hold the rack normally out of mesh with the pinion 157, a pawl 166 is provided upon the bracket 159 to engage ratchet teeth 167 upon the rack, as shown in Fig. 8, and it will be understood that when the rack is to be raised or lowered the pawl will be released after the rack has been shifted to the proper side.

It is to be understood that the rear tractor ground-engaging elements may be of any desired form best adapted to the particular work in hand and I have illustrated ordinary ground wheels in Fig. 1 and in Fig. 2, I have shown the endless chain form of tractor 127 at one side of the machine, while at the other side I have shown a smooth surface wheel 167ª. In Fig. 3 the wheels at both sides of the machine are shown as having smooth surfaces but the wheel at one side is supported in a rectangular offset 168 of the main frame while at the other side it is supported in the arch 136. This arch 136 permits the use of a smaller supporting wheel 169 at the outer side of the arch so that the machine may be used for cultivating fields in which plants are growing, the arch serving to permit the machine to pass along the row of growing plants as will be readily understood upon reference to Fig. 4. When the wheel 169 is employed, an adjusting shaft 170 equipped with a hand wheel 171 at its upper end will be mounted in suitable bearings upon the outer side of the arch 136 and the axle 172 of the wheel 169 will pass through the slot 138 in the side of the arch. By properly manipulating the hand wheel 171, the shaft 170 may be adjusted vertically in its bearings so that the axle 172 will be set at a higher or lower point of the slot 138 and the wheel 169, therefore, adjusted to support the machine at the desired height relative to the surface of the ground and to accommodate the height of the growing plants.

In the operation of the machine, if the clutch 55 be thrown forward the rack 52 will be locked to the master wheel 32 and will rotate therewith, the gear 38 being constantly locked to the master gear so that with the parts in the position shown in Fig. 1 power will be transmitted from the engine to the worm 11 and also to the shaft 44. If the clutch 47 be raised all the power will be transmitted to the worm 11 and the gear 39 will simply run free. If the clutch 47 be lowered so as to lock the gear 39 to the shaft 41 while at the same time the clutch 62 is moved rearwardly all the power will be transmitted to the shaft 44. If the clutch 55 be withdrawn the gear 32 will rotate freely, the pinions 36 simply rolling upon the gear 38. It will thus be seen that by merely adjusting the differential members the power may be transmitted wholly to the rear wheels, wholly to the front wheel or partly to both. It may be deemed unnecessary to employ the clutch 76 and the gear 64 inasmuch as when power is applied to both the front and rear wheels, the wheels must rotate in the same direction and the direction of rotation will be controlled by the reverse gearing 12, 22 and 23. It may sometimes, however, be more convenient to control the direction of rotation of the shaft 66 by shifting the clutch 75, especially if no power is being transmitted to the rear wheels, and I, therefore, prefer to provide the clutch 75 and the means for shifting the same.

The U-shaped frame 129 will permit a traction wheel to be moved vertically so that the wheels at the two sides of the machine may be set at different elevations and the machine thus adapted to run over a partly plowed field, one of the wheels running upon the unplowed ground and the other running in the furrow. The disposition of the steering wheel at one side of the longitudinal center of the machine will be especially advantageous in this connection inasmuch as it will counteract the drag exerted upon the wheel running in the furrow and the holding of the machine to a straight path will be less difficult. The vertical adjustment of the traction wheels will also facilitate the setting of the machine to run upon a hillside and the vertical adjustment of the front ends of the endless chain tractor members will be found advantageous for the same reason. The elliptical springs by which the front ends of the endless chain tractor members are carried adds to the flexibility of the machine and permits said members to readily ride over obstructions or irregularities in the surface of the ground.

Having thus described the invention, what is claimed as new is:

1. The combination of a supporting frame, a casing mounted in said frame for rotation about a vertical axis, a steering wheel carried by said casing eccentric to its axis of rotation, a steering shaft operatively connected with said casing, a shaft mounted in said casing in the axis of rotation of the same and geared at its lower end to the steering wheel, a power shaft mounted on the supporting frame and operatively connected with the shaft mounted in the casing, transmission gearing including members on the steering shaft and the power shaft, and a controlling shaft mounted on the supporting frame intermediate the power shaft and the steering shaft for sliding and rocking movement and acting on the transmission gearing whereby to shift the same from active to inactive position and to determine the direction of rotation of the steering shaft.

2. In a tractor, the combination with a supporting frame, of a shaft disposed longitudinally thereof, means on the frame for imparting power to said shaft, a casing rotatably mounted in the front end of the frame, a steering wheel carried by said casing, a steering shaft operatively connected with said casing, a clutch pulley on the first-mentioned shaft, a slidably mounted rock shaft adjacent said shaft, a fork carried by said rock shaft, a train of gearing comprising a pinion on the steering shaft, and an elongated pinion loosely mounted on the first-mentioned shaft and having a clutch hub engaged by said fork adapted to engage the clutch pulley when the rock shaft is slid, a bracket, pinions carried by said bracket adapted to connect the pinion on the steering shaft with the elongated pinion on the first-mentioned shaft, and a crank on the rock shaft engaging said bracket whereby to throw one or another of the intermediate pinions into engagement with the elongated pinion.

3. In a tractor, the combination of a main frame, a casing rotatably mounted in said main frame at the front end thereof, a steering wheel carried by said casing eccentric to its vertical axis of rotation, a steering shaft mounted on the frame and operatively connected with said casing, a driving shaft mounted upon the frame, a shaft mounted in said casing on the axis of rotation thereof and operatively connected at its lower end with the steering wheel, means for applying power to said driving shaft, and means for operatively connecting the driving shaft with the steering shaft.

4. In a tractor, the combination of a rear driving shaft, a worm shaft disposed above the driving shaft and operatively connected therewith, a transmission shaft arranged in alignment with the worm shaft, means for applying power to the transmission shaft, a master gear secured upon the transmission shaft and having a hub of angular cross section, a gear having a hub of angular cross section fitted loosely upon the transmission shaft, said gear engaging the master gear, a clutch keyed upon the worm shaft, a second clutch loosely mounted on the worm shaft and adapted to engage the first-mentioned clutch and provided with spaced fingers adapted to engage the flat faces of the hubs of the master gear and the gear engaging the master gear, a front driving shaft, gearing acting on said front driving shaft, and a clutch arranged to connect said gearing with the master gear.

In testimony whereof I affix my signature.

JOHN C. ROSS. [L. S.]